(12) United States Patent
De Steur et al.

(10) Patent No.: US 6,639,180 B1
(45) Date of Patent: Oct. 28, 2003

(54) METHOD FOR DESCRIBING A PREDETERMINED DESIRED COURSE WITH A BEAM CONSISTING OF PARTICLES OR WAVES AND USE OF THIS METHOD

(75) Inventors: Hubert De Steur, Drongen (BE); Marcel Heerman, Merelbeke (BE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/018,381

(22) PCT Filed: Jul. 5, 2000

(86) PCT No.: PCT/DE00/02189

§ 371 (c)(1), (2), (4) Date: Apr. 29, 2002

(87) PCT Pub. No.: WO01/02128

PCT Pub. Date: Jan. 11, 2001

(30) Foreign Application Priority Data

Jul. 5, 1999 (DE) .......................... 199 30 976

(51) Int. Cl.⁷ .............................................. B23K 26/00
(52) U.S. Cl. ........................... 219/121.85; 219/121.83; 219/121.78
(58) Field of Search .................. 219/121.85, 121.83, 219/121.78, 121.79, 123

(56) References Cited

U.S. PATENT DOCUMENTS

| 3,736,402 A | * | 5/1973 | Mefferd et al. ....... 219/121 LA |
| 4,317,981 A | | 3/1982 | Chubarov et al. .......... 219/121 |
| 4,348,576 A | * | 9/1982 | Anderl et al. ........ 219/121 EW |
| 4,918,611 A | | 4/1990 | Shyu et al. ............. 364/474.08 |
| 5,173,582 A | * | 12/1992 | Sakamoto et al. ..... 219/121.25 |
| 5,593,606 A | | 1/1997 | Owen et al. ........... 219/121.71 |
| 6,262,425 B1 | * | 7/2001 | Gordon et al. ........... 250/491.1 |

FOREIGN PATENT DOCUMENTS

| DE | 19544067 | 5/1996 |
| DE | 19702752 | 7/1998 |
| EP | 0128993 | 12/1984 |
| WO | 9940473 | 8/1999 |

OTHER PUBLICATIONS

English–language Abstract for JP 10156567A, published Jun. 16, 1998.
English–language Abstract for JP 10249563A, published Sep. 22, 1998.
English–language Abstract for JP 63 115687, published May 20, 1988.

* cited by examiner

Primary Examiner—M. Alexandra Elve
(74) Attorney, Agent, or Firm—Baker Botts LLP

(57) ABSTRACT

The invention relates to a method for describing a predetermined desired course (1) with a beam of particles or waves, wherein a movable beam-directing device influences the direction of the beam, so that the latter describes an actual course (3, 4). The deviation of the actual course (3, 4) from the desired course due to inertia is minimized by specifying a corrected desired course (2), which describes diversions at the point of direction changes. The invention also relates to the use of this method for laser structuring or for writing guard plates or dial plates.

10 Claims, 2 Drawing Sheets

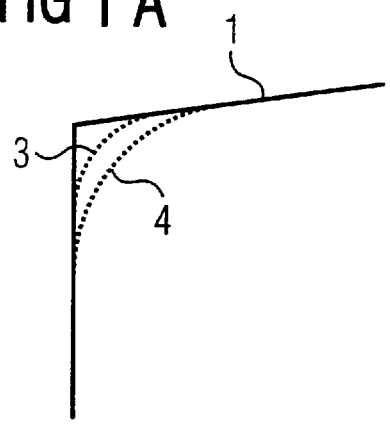
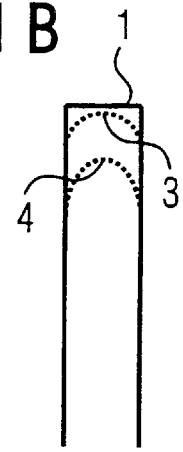
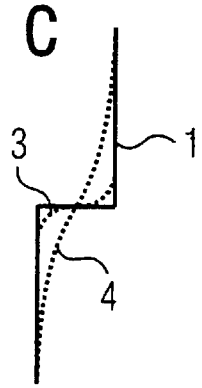
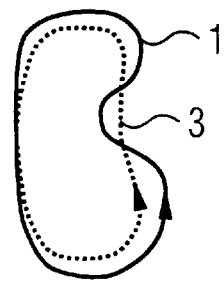
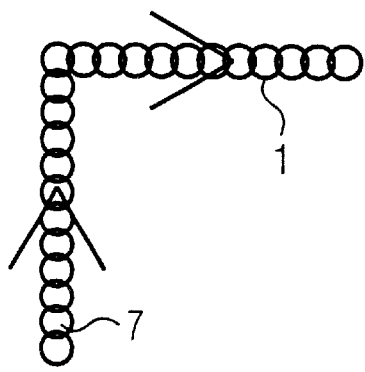
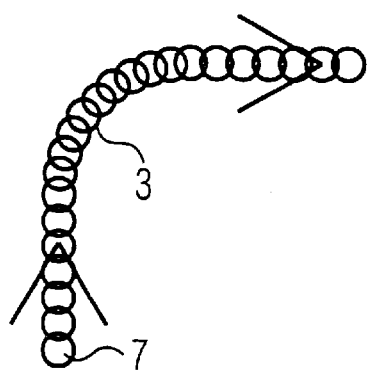

METHOD FOR DESCRIBING A PREDETERMINED DESIRED COURSE WITH A BEAM CONSISTING OF PARTICLES OR WAVES AND USE OF THIS METHOD

FIELD OF THE INVENTION

The invention relates to a method for describing a predetermined or desired course with a beam of particles or waves, wherein the direction of the beam can be modified by a movable beam-directing device. The invention also relates to the use of the novel method.

BACKGROUND OF THE INVENTION

U.S. Pat. No. 5,593,606 discloses methods in which a pulsed laser beam is deflected by a motor-controlled mirror. The data of a predetermined desired course is translated by a drive device into control instructions for the motor. The movable beam-directing device influences the direction of the beam which describes an actual course with a velocity $V_B$ when projected onto a surface.

These known methods have the disadvantage that in the case of a desired straight-line course the actual course is described with a constant delay by the response error time $t_S$, owing to the mechanical inertia of the beam-directing device. The effect of this response error is that the actual course that corresponds to a curved desired course deviates therefrom. In this case, the deviation depends on the course velocity $V_B$. FIGS. 1a to 1d show various examples of these deviations. The desired course 1 and the actual course 3 for a low course velocity are represented in each case. An actual course 4 for a high course velocity is also represented in FIGS. 1b and 1c.

The deviation from the desired course is commensurately greater as the course velocity with which the desired course is described increases. The effect of the deviation of the actual course from the desired course is that, for a constant laser-pulse frequency, an increased number of laser pulses are delivered onto a shortened course segment. This is represented in FIGS. 2a and 2b. FIG. 2a represents a series of laser spots 7 along a desired course 1. The arrows indicate the movement direction of the laser beam. FIG. 2b represents a series of laser spots 7 along the actual course. The arrows indicate the movement direction of the laser beam. If the laser beam is being used to structure a surface, then this increased pulse density can cause higher energy input per area with all possible undesired consequences.

SUMMARY OF THE INVENTION

It is an object of the present invention to provide a method for describing a predetermined or desired course with a beam of particles or waves, in which the deviation of the actual course from the predetermined course is minimized. Accordingly, the present invention provides a method for describing a predetermined/desired course with a beam of particles or waves, in which a movable beam-directing device influences the direction of the beam. The beam is directed by the beam-directing device onto a surface, on which it describes an actual course with the velocity $V_B$. A drive device converts the desired course into a corrected desired course, which describes a diversion in the vicinity of a discrete direction change from a first direction of the desired course to a second direction of the desired course. This diversion is obtained by appending and/or deleting arbitrary sections to/from the desired course. The data of the corrected desired course is translated by the drive device into control instructions for the beam-directing device.

Since the desired course to be described is already known, the novel method of correction of the desired course minimizes the deviations of the actual course from the desired course. Direction changes of the desired course where the desired course has corners are particularly critical for the deviations. In the vicinity of these corners, the actual course can be brought closer to the desired course by incorporating into the desired course diversions which extend outside the corners and compensate substantially for the undesired roundings of the actual course which are represented in FIG. 1. Correction sections which may be straight-line sections are particularly useful, because straight desired courses produce no deviations in the actual course.

In methods for describing a predetermined desired course, in which the actual course is specified with a constant course velocity $V_B$, a straight-line desired course is described as the actual course by the laser beam with a constant delay by the response error time $t_S$, owing to the mechanical inertia of the beam-directing device. The method according to the invention uses the response error time $t_S$ as a basis and hence is particularly advantageous. The corrected desired course is obtained from the desired course by adding a first straight-line section of length L, which points in the first direction, at the point of a direction change from a first to a second direction. For the length of this straight-line section: $L = V_B \times t_S$. Also, a second straight-line section of length L is added at the far end of the first straight-line section from the point of the direction change. The maximum possible course velocity $v_{max}$ counter to the first direction is specified for this second straight-line section. In this case: $v_{max} > v_B$. The desired course is accordingly extended for a short distance beyond the point of the direction change. Fast return to the point of the direction change thereupon takes place.

The method according to the present invention can be used particularly advantageously for desired courses, which are curved. In this case, the desired course is approximated with a continuous direction change by a desired course with successive discrete direction changes. The desired course is then corrected according to the method of the present invention.

In a preferred embodiment of the invention a pulsed beam is used. During the structuring of a surface by means of laser beams, a problem that may arise is that an increased laser-pulse density is applied to a shortened actual-course segment owing to the course inaccuracies. This increased laser-pulse density can be avoided by the course correction.

The method according to the present invention is preferably used whenever a laser beam is used as the beam, and a mirror with a galvanometer motor is used as the movable beam-directing device. Indeed, for mirrors with a galvanometer motor, the problem the beam-directing device's mechanical inertia has to date been very noticeable.

The method according to the invention can be used particularly advantageously for processing or modifying a surface, in particular for writing dial plates, or for applying or removing material, for example during laser structuring or doping of semiconductor surfaces by means of ion beams.

Where an ion beam is used as the beam, then it is particularly preferred to use a magnetic lens as the beam-directing device.

BRIEF DESCRIPTION OF THE DRAWINGS

The present invention is described in greater detail below with reference to the drawings in which:

FIGS. 1a–1d illustrate various examples of deviations due to response error in the prior art methods;

FIG. 2a represents a series of laser spots along a desired course;

FIG. 2b represents a series of laser spots along an actual course;

DETAILED DESCRIPTION OF THE INVENTION

Figure 3:
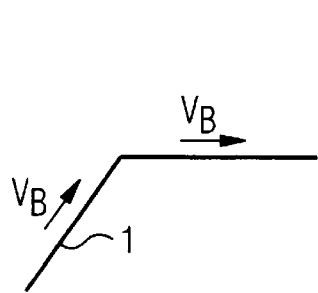
FIGS. 3a to 3c illustrate, respectively, a predetermined/desired course, a desired course corrected according to the invention, and the actual course resulting therefrom.
Figure 3:
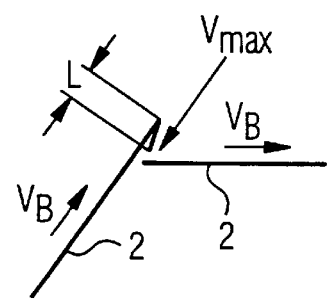
Figure 3:
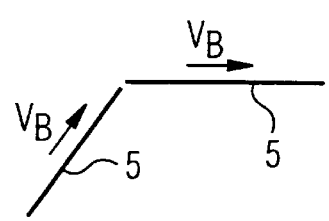

FIG. 3a shows a predetermined desired course 1, in which a direction change from a first to a second direction takes place. The desired course 1 is described with the course velocity $V_B$, in each case in the direction of the arrows.

FIG. 3b shows the corrected desired course 2 corresponding to FIG. 3a. At the turning point of the desired course a first straight-line section having a length L, and which points in the first direction is added. This straight-line section is described with the course velocity $V_B$. A second straight-line section which has the same length as the first, but which points in the opposite direction, is added to the first straight-line section. This second straight-line section is described with the maximum course velocity $v_{max}$, so that it virtually represents a return instruction to the point of the direction change. After the bend, following the second direction, the corrected desired course corresponds to the desired course which is described with the course velocity $V_B$.

FIG. 3c shows the achieved actual course 5 corresponding to FIG. 3b. The two straight-line segments are described with the course velocity $V_B$ in the direction given by the arrows. Apart from a small gap and a slight curvature of the second direction section at the point of the direction change, the corrected actual course 5 corresponds to the predetermined/desired course.

Figure 4:
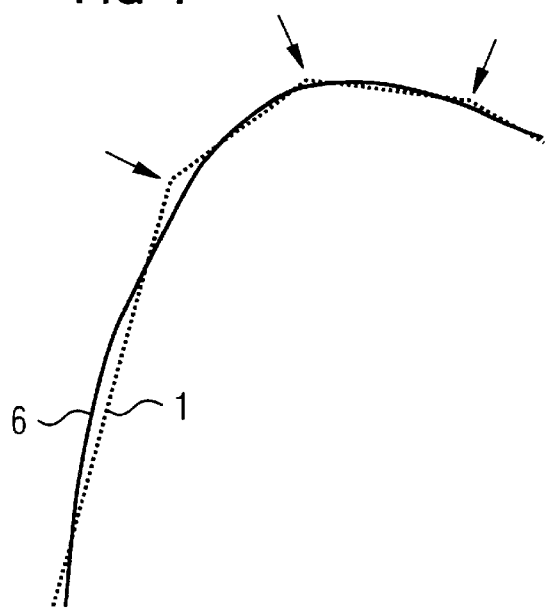
FIG. 4 illustrates a desired course with continuous direction changing, which has been approximated by a desired course with discrete direction changes.

FIG. 4 shows a curved desired course 6. It is approximated by a desired course 1 with successive discrete direction changes. The points of the direction changes are indicated by arrows. This desired course 1 with discrete direction changes may then itself be corrected by using with the method according to the present invention.

The present invention is not to be understood as limited to the embodiments disclosed by way of the examples, hereinabove, but rather is to be understood as entitled to the scope afforded by the following claims.

What is claimed is:

1. A method for describing a course in accordance with a desired course having a direction change, comprising using a beam of particles or waves, and a movable beam-directing device which influences the direction of the beam so that it describes an actual course with a velocity $V_B$, when projected onto a surface, further comprising converting the desired course by a drive device, while taking account of a response error time due to the beam-directing device's mechanical inertia in a corrected desired course which, in the vicinity of the direction change from a first direction to a second direction describes a diversion which is obtained by appending and/or deleting arbitrary sections to/from the desired course, and wherein the corrected desired course is translated by the drive device into control instructions for the beam-directing device.

2. The method according to claim 1, wherein the arbitrary sections are straight-line sections.

3. The method according to claim 1, further comprising describing the actual course with a constant course velocity $V_B$, when the desired course is a straight-line, and further describing the actual course with a constant delay as a function of the response error time, and obtaining the corrected desired course from the desired course by adding a first straight-line section, which points in a first direction, having a length defined by the formula $L = V_B \times t_S$, to the course at the point of the direction change, and by adding a second straight-line section, which points in the opposite direction and for which a maximum course velocity $v_{max}$ is specified, where $v_{max} > v_B.125$, to the said course at the far end of the first straight-line section from the point of the direction change.

4. The method according to claim 1, wherein a desired course having a continuous direction change is approximated by a desired course having successive discrete direction changes.

5. The method according to claim 1, wherein the beam is a pulsed beam.

6. The method according to claim 1, wherein the beam is a laser beam, and is the movable beam-directing device is a mirror with a galvanometer motor.

7. The method according to claim 1 used in processing or modifying of a surface.

8. The method according to claim 1 used in the writing guard plates or dial plates.

9. The method according to claim 1, wherein an ion beam is used as the beam and a magnetic lens is used as the beam-directing device.

10. The method according to claim 1, used for applying or removing material from a surface.

* * * * *